Patented Mar. 14, 1939

2,150,683

UNITED STATES PATENT OFFICE 2,150,683

DISTILLATION PROCESS

Kenneth C. D. Hickman, Rochester, N. Y., assignor, by mesne assignments, to Distillation Products, Inc., Rochester, N. Y., a corporation of Delaware No Drawing. Application October 26, 1935, Serial No. 46,957

13 Claims. (Cl. 202—52)

This invention relates to the purification by distillation of natural organic products, such as vegetable and animal oils, fats, waxes and the like and more particularly to the prevention of oxidation during the distillation of readily oxidizable materials.

Organic products, especially fish and vegetable oils and fats contain a material amount of absorbed gases such as air and peroxides which are destructive to easily oxidizable materials contained in the oils. As is well known, oils containing such oxidizable constituents lose their content of the oxidizable material upon prolonged standing or during application of heat. This is especially true of oils and concentrates containing vitamins such as A, D, and/or E. It is believed that the oxygen and peroxides present in the oil react with the vitamins to convert them into oxidation products of little or no value. The destruction of such oxidizable constituents during distillation is especially marked and its prevention is of considerable importance.

Processes of vacuum distillation of oils and fats are well known, but the problem of carrying out the distillation without objectionable loss of oxidizable constituents has existed for some time and until the advent of the present invention no means for avoiding such objectionable results have been known.

This invention has as an object to overcome the destruction of readily oxidizable materials during distillation and to provide a process of distillation whereby such materials may be purified and concentrated without material destruction. A further object is to provide a process of vacuum distillation of natural oils, fats and waxes whereby oxidizable constituents of the oils may be distilled and concentrated without objectionable loss due to oxidation. Another object is to provide a process for the molecular distillation of animal and vegetable oils and fats containing easily oxidizable vitamins such as vitamins A and D whereby the vitamins may be concentrated without simultaneous oxidation. A further object is to provide a vitamin concentrate containing the vitamin in the form in which it occurs in the natural starting material and an antoxidant to improve its keeping qualities.

These objects are accomplished by the following invention by adding to the material to be distilled an antoxidant such as hydroquinone having a volatility sufficiently near to that of the oxidizable constituents that it will distil entirely or in part with them and thus prevent oxidation during the entire process of distillation. Since it may be undesirable to leave the antoxidant in the distillate it may be removed after distillation by appropriate treatment.

It is well known that oils of commerce contain a material amount of absorbed oxygen from the air and peroxides resulting from the action of oxygen. These constituents react somewhat slowly with the oxidizable constituents at ordinary temperatures, but react rapidly upon the application of heat during distillation. Thus during the vacuum distillation of vitamin-containing oils, such as fish liver and body oils, it has been found that vitamin A comes over with a loss in some cases of about 10 to 20% of the vitamin originally present in the oil. The vitamin D is likely to suffer an even higher loss during distillation. While this loss is partly due to thermal decomposition, a material proportion is due to oxidation by peroxides and oxygen present in the oil. As the oils are distilled under high vacuum it is practically impossible to prevent entirely the leaking of oxygen into the apparatus and a considerable loss of the oxidizable constituents therefore results.

In the following examples and description I have set forth several of the preferred embodiments of my invention, but it is to be understood that they are included merely for purposes of illustration and not as a limitation thereof.

In carrying out my invention a small amount of an antoxidant having a volatility sufficiently near to that of the desired distillate to distil entirely or in part with it is added to the oil to be distilled and preferably before heating of the oil has taken place. The process is effectively used in vacuum distillation processes and especially with processes of molecular distillation.

*Example 1.*—To 100 liters of cod liver oil there is added from 1 to 10 grams of hydroquinone and the mixture is subjected to molecular distillation at a saturation pressure of about .001 mm. A distillate is withdrawn representing 5% of the original material. This distillate is orange in color and when cold, crystalline fatty acids and sterols separate, which may be filtered off. The distillate is found to contain nearly all the original vitamin A, most of the vitamin D, and most of the added hydroquinone. The yield of vitamin during distillation is greater than would have been the case in the absence of hydroquinone and the distillate has superior keeping qualities.

*Example 2.*—To 100 liters of cod liver oil there is added from 1 to 10 grams of 1:2:4 trihydroxybenzene and the mixture is then subjected to molecular distillation at a saturation pressure of about .001 mm. A first fraction is distilled from the oil at approximately 120°, a second fraction is distilled at approximately 150°, a third fraction is distilled at approximately 170°, and a fourth fraction at approximately 200°. It is found that most of the free vitamin A accumulates in the first fraction, most of the vitamin D, in the second fraction, the vitamin A esters in the third fraction, and the vitamin D in the fourth. The preservative trihydroxybenzene tends to collect in the early and middle fractions where it is required particularly to preserve the vitamin A. Nevertheless, traces survive to protect the higher boiling material.

*Example 3.*—To 10 liters of tuna liver oil, 10 cc. of furfural are added and the mixture is then subjected to molecular distillation at a pressure of .001 mm. Although the furfural is relatively volatile, the degree of separation obtained during one stage of molecular distillation is insufficient to drive all the furfural from the oil. Although much furfural is lost in the degassing system, sufficient remains to give useful protection at the earlier stages of distillation. The cuts may be withdrawn in the manner indicated in the one or the other of the previous examples.

The temperature of distillation may be varied to obtain a relatively pure vitamin containing the antioxidant or the vitamins A and D may be obtained as a mixture with the antioxidant in a single fraction. The antioxidant selected may have a vapor pressure intermediate those of the respective vitamins so that portions of it distill over with both when separated as distinct fractions or a mixture of antioxidants may be added, one constituent of which has a volatility near one of the vitamins and the other near that of the other vitamin. This expedient also may obviously be used where several oxidizable substances other than vitamins are to be collected as separate fractions. It is well known that a substance does not distill sharply at its boiling point when mixed with other materials having a similar volatility, but distills as a mixture over a considerable temperature range. For this reason the use of one antioxidant is often satisfactory.

The distillate obtained is a mixture of the concentrated oxidizable substance and a small amount of antioxidant. The antioxidant may be left in the concentrate to improve its keeping qualities and, in cases where a nontoxic antioxidant is employed, may be left in the concentrate even when used as a therapeutic agent. Where it is desired to remove the antioxidant, it may be separated by hydrolysis with alkali or other appropriate treatment obvious to one skilled in the art.

The proportions of antioxidant to be used vary greatly depending on the boiling point of the fraction desired and the boiling point of the particular antioxidant chosen. If the antioxidant has a boiling point considerably lower than the desired fraction it must be used in larger amounts than otherwise necessary so that portions of it will remain to distill over with the fractions containing the oxidizable constituents. Proportions of antioxidant approaching the approximate weight to the distilland may be desirable in some cases depending on the above factors, but considerably smaller amounts are usually found to be suitable such as between .000,001 and 10%. The particular amount to be used can of course be easily determined by a simple distillation on a small scale, to find what amount of antioxidant must be added for it to be present during the distillation in amounts sufficient to prevent oxidation.

Processes of molecular distillation are well known and the basic idea has been applied to the distillation of many different types of compounds. Thus in U. S. Patent No. 1,955,321 difficultly volatile mineral oils are distilled. In my U. S. Patent Nos. 1,925,559 and 1,942,858 I have disclosed the molecular distillation of fish oils to obtain vitamin concentrates. The present invention is especially applicable to processes of this type.

The exact operating conditions when employing my invention in a molecular distillation process are largely a matter of expediency and operating convenience. The temperatures usually vary from about 70° to 250° C. and preferably between about 90° and 200° C., but of course depend upon the particular material or fraction desired and the vacuum used. The pressures used are subject to considerable variation depending upon the temperature and the distance between the evaporating and condensing surfaces. With this distance and the pressure as interchangeable quantities, no real lower limit to the pressure can be set, but for reasons of expediency I prefer not to operate with a residual gas pressure of less than .01 micron or a distance between the condensing and evaporative surfaces of over 10 feet. In determining the high pressure limit it has been found preferable to use pressures of less than .1 mm. preferably less than .01 mm. and distances between the evaporative and condensing surfaces of not less than .1 inch. The distance between these surfaces should be less than the mean free path of the molecules of residual gas under the pressure and temperature conditions obtaining.

There is yet another aspect of the pressure-temperature-distance relation which must be considered in the operation of a molecular distillation process. It has been shown for instance, that when the pressure of residual gas reduces the mean free path to $\frac{1}{5}$ the distilling distance the rate of distillation is diminished to $\frac{1}{100}$. In an example, the pressure of this residual gas may be taken as 5 microns. If now the temperature of the oil under treatment be raised until the saturation pressure of the vapor is greater than 5 microns, then all the residual gas will be driven from the still and distillation will proceed at the high rate characteristic of a vapor stream of 5 microns density. A condition of accelerated molecular distillation will supervene in which the essential requirement, to wit, the absence of substantially all interfering gas, has been met, yet the residual gas in the vacuum manifolds and measuring devices will exert a pressure of 5 microns and will suggest that a condition of molecular distillation does not exist when in fact, it does.

It will be obvious that many changes may be made in the procedure outlined in the above description within the scope of my invention. In such modifications due consideration will of course be given to the particular material undergoing distillation. As the antioxidant chosen must have a vapor pressure sufficiently near to that of the oxidizable fraction desired, this must be kept in mind in the selection of the particular antioxidant to be used. In the above description I have referred to the use of hydroquinone, however, my invention is broadly applicable to the use of any antoxidant having a volatility in the neighborhood of the oxidizable material, such as pyrocatechol, hydroxyhydroquinone, p-amino phenol, pyrogallol, 1:2:4 trihydroxy benzene, furfural, 2 amino-5-hydroxy toluene, benzyl-p-aminophenol, p-hydroxy phenyl morpholine, dibenzyl-p-amino phenol, 1-5 dihydroxy naphthalene, 2-4 diamino diphenylamine, P,P' diamino diphenyl amine, etc. The phenolic antioxidants have been found to be especially suitable.

Although I have found it convenient to describe my process by reference to the treatment of specific oils it is applicable to the distillation of any easily oxidizable constituent from any oil containing it. Due to the extremely unstable character of vitamins A and D the process is especially useful in distilling these vitamins from animal oils containing them, such as tuna, jew, ling cod, halibut, salmon, herring, mackerel, sardine, menhaden, etc., fish, body and liver oils. While my process is especially useful in a molecular distillation process it obviously can be applied to any high vacuum distillation process in which the easily oxidizable material is present in the material being distilled. My invention is also applicable to prevention of loss by oxidation of the components of an oil or other material during degassing prior to molecular distillation.

While I do not confine myself to any particular theory or explanation of the manner in which my invention operates, it is probable that the antioxidant prevents oxidation of the distilland during heating and that its vapors are completely intermixed with those of the oxidizable constituents during distillation and thereby prevents its oxidation while in a heated vaporous condition. As it is also present in the distillate, it prevents oxidation while it is cooling and subsequent oxidation during storage.

The herein described invention constitutes a simple, economical and highly effective solution of the vexatious and difficult problem of preventing loss of readily oxidizable substances during vacuum distillation of oils containing them. The process is especially valuable when costly oils, such as fish oils, are distilled to obtain vitamin concentrates. The ingress of air into such vacuum distillation processes is very difficult to avoid and by means of the present invention the deleterious action of such oxidation agents is materially prevented. Another outstanding advantage of the herein described process is that complex and expensive apparatus designed to entirely exclude ingress of air during vacuum distillation need not be used. Furthermore by means of the invention expensive and laborious pretreatment of the oil before distillation to remove all harmful constituents is unnecessary.

What I claim is:

1. The process of preventing oxidation of vitamins during high vacuum distillation which comprises adding an antoxidant to a fish oil containing fat soluble vitamins, subjecting the oil to high vacuum distillation and separating a fraction containing vitamin and the antoxidant the antoxidant being one which distills at least in part with the vitamin fraction.

2. The process of preventing oxidation of vitamins during vacuum distillation which comprises subjecting cod liver oil containing an antoxidant to high vacuum distillation and separating a fraction containing the vitamin content of the oil and the antoxidant the antoxidant being one which distills at least in part with the vitamin fraction.

3. The process which comprises adding an antoxidant to a fish oil containing vitamins A and D, subjecting the oil to distillation at a temperature of 70° to 250° C. and a pressure of less than about .1 mm. and condensing the distillate containing vitamin and antoxidant at a distance from the evaporative surface of less than about the mean free path of the molecules of residual gas the antoxidant being one which distills at least in part with the vitamin fraction.

4. The process which comprises adding an antoxidant to cod-liver oil, subjecting the oil to molecular distillation at a temperature of between 70° and 250° C. and a pressure of less than about .1 mm. and condensing the distillate containing vitamin and antoxidant at a distance from the evaporative surface of less than the mean free path of the molecules of residual gas the antoxidant being one which distills at least in part with the vitamin fraction.

5. The process which comprises adding an antoxidant to a fish oil containing vitamins A and D, subjecting the oil to distillation at a temperature of between about 90 and 200° C. at a pressure of less than about .01 mm. and condensing distillate containing vitamin and antoxidant at a distance from the evaporative surface of less than the mean free path of the molecules of residual gas the antoxidant being one which distills at least in part with the vitamin fraction.

6. The process which comprises adding hydroquinone to cod-liver oil and then subjecting the oil to distillation at a pressure below about .1 mm. and at a temperature of between about 70° and 250° C. and condensing fractions containing the vitamins and the hydroquinone at a distance from the evaporative surface of less than the mean free path of the molecules of residual gas under the conditions obtaining.

7. The process which comprises adding 1:2:4 trihydroxybenzene to a fish oil containing a fat soluble vitamin, subjecting the oil to distillation at between about 70° and 250° C. at a pressure of less than about .1 mm. and condensing distillate containing 1:2:4 trihydroxy-benzene and a vitamin at a distance from the evaporative surface of less than the mean free path of the molecules of residual gas.

8. The process which comprises adding an antoxidant to an animal or vegetable oil containing a fat soluble vitamin, subjecting the oil to high vacuum distillation and separating a distillate containing a vitamin and an antoxidant, the antoxidant being one which distills at least in part with the vitamin containing fraction.

9. In the process of molecular dstillation of fish oils to obtain vitamin containing distillates, the step which comprises adding to the oil prior to distillation an antoxidant which distills at least in part with the vitamin fraction to be separated.

10. The process which comprises adding an antoxidant to a fish oil containing a fat soluble vitamin, subjecting the mixture to distillation at a pressure below .01 mm. and condensing distillate containing a vitamin and antoxidant at a distant from the evaporative surface of less than about the mean free path of the molecules of residual gas, the antoxidant used being one which distills at least in part with the vitamin containing fraction.

11. The process of high vacuum distillation of an animal or vegetable oil containing a substance which is to be recovered as a distillate and which would be oxidized during the high vacuum distillation treatment which comprises adding an antoxidant to the oil subjecting the mixture to distillation at a temperature of between about 70° and 250° C. at a pressure of less than about .1 mm. and condensing the easily oxidizable material as a distillate mixed with the antoxidant at a distance of less than about the mean free path of the molecules of residual gas, the antoxidant being one which distills at least in part with the easily oxidizable substance.

12. The process of high vacuum distillation of a mixture containing a substance which is to be removed as a distillate and which would be oxidized during the high vacuum distillation treatment which comprises adding an antoxidant to the mixture to be subjected to high vacuum distillation, distilling the mixture under a high vacuum and collecting a mixture of the oxidizable substance and antoxidant as a distillate, the antoxidant employed being one which distills at least in part with the oxidizable substance.

13. The process of high vacuum distillation of an animal or vegetable oil containing a substance which is to be recovered as a distillate and which would be oxidized during the high vacuum distillation treatment which comprises adding an antoxidant to the oil, distilling the mixture at a pressure of less than about .1 mm. and collecting a mixture of oxidizable substance and antoxidant as a distillate, the antoxidant employed being one which distills at least in part with the oxidizable substance.

KENNETH C. D. HICKMAN.